United States Patent
Kuennen et al.

(10) Patent No.: US 6,368,504 B1
(45) Date of Patent: Apr. 9, 2002

(54) CARBON BLOCK WATER FILTER

(75) Inventors: Roy W. Kuennen, Caledonia; Karen J. VanderKooi, Grand Rapids; Roy M. Taylor, Jr., Rockford; Kenneth E. Conrad, Ada, all of MI (US)

(73) Assignee: Alticor Inc., Ada, MI (US)

( * ) Notice: Subject to any disclaimer, the term of this patent is extended or adjusted under 35 U.S.C. 154(b) by 0 days.

(21) Appl. No.: 09/706,973

(22) Filed: Nov. 6, 2000

(51) Int. Cl.$^7$ ............................................. B01D 39/16

(52) U.S. Cl. .................... 210/315; 210/489; 210/502.1; 210/506; 210/510.1; 210/496; 502/416; 264/122

(58) Field of Search .......................... 210/502.1, 510.1, 210/506, 315, 489, 496; 502/416; 264/122

(56) References Cited

U.S. PATENT DOCUMENTS

| | | | |
|---|---|---|---|
| 4,664,683 A | * 5/1987 | Degen et al. | 210/502.1 |
| 4,753,728 A | 6/1988 | VanderBilt et al. | |
| 4,859,386 A | 8/1989 | VanderBilt et al. | |
| 5,017,318 A | 5/1991 | Vanderbilt et al. | |
| 5,019,311 A | 5/1991 | Koslow | |
| 5,331,037 A | 7/1994 | Koslow | |
| 5,403,497 A | 4/1995 | Schultz | |
| 5,453,118 A | 9/1995 | Heiligman | |
| 5,840,348 A | 11/1998 | Heiligman | |
| 5,882,517 A | 3/1999 | Chen et al. | |
| 5,922,803 A | 7/1999 | Koslow et al. | |

FOREIGN PATENT DOCUMENTS

EP 1 023931 A1 8/2000

OTHER PUBLICATIONS

"Drinking Water Filtration Using Granular Activated Carbon"—Gary Van Stone, Daniel R. Brooks & Joel S. Neulight, pp. 411–422 (1999).

"Particle Size and Chemical Effects on Contact Filtration Performance"—John E. Tobiason, Gordon S. Johnson, Paul K. Westerhoff & Balasubramaniam Vigneswaran, pp. 520–539, (May–Jun. 1993).

Abstract: "Efficiency of Activated Carbon as a Function of Particle Size"—G.S. Kodin, B.P. Lutskaya, G.L. Oshmyan, N.I. Slavutskaya, Fermentn. Spirt. Prom–st. (1967), 33(1), 15–19.

Abstract: "Direct Filtration Optimization Using Granular Activated Carbon for Compliance with the Surface Water Treatment Rule"—Kevin T. Walsh, Larry W. VandeVenter & Joel S. Neulight, J. N. Engl. Water Works Assoc. (1998), 112(3), 203–226.

Abstract: "The Benefit of On–Line Particle Counting; Optimization of Pilot and Full–Scale Clarification and Filtration Processes for Removal of Giardia– and Cryptosporidium –sized particle"—L.W. VandeVenter & M.K. McAvoy, J.N. England Water Works Assoc. (19970900) vol. 11, No. 3, pp. 212–246.

(List continued on next page.)

Primary Examiner—Matthew O. Savage
(74) Attorney, Agent, or Firm—Warner Norcross & Judd

(57) ABSTRACT

An activated carbon block filter including a unique bonded carbon mixture. The carbon mixture preferably includes a mean particle diameter in the range of about 60 microns to about 80 microns and a particle size distribution having less than 10% by weight of particles larger than 140 mesh and less than 10% by weight of particles smaller than 500 mesh. More preferably, the carbon mixture includes a mean particle diameter in the range of about 65 microns to about 75 microns. Even more preferably, the carbon mixture includes a mean particle diameter of about 70 microns and a particle size distribution having less than 7% by weight of particles larger than 140 mesh and less than 7.5% by weight of particles smaller than 500 mesh.

23 Claims, 7 Drawing Sheets

OTHER PUBLICATIONS

Abstract: "Evaluation of the Adhesion Number of Filter Powders"—A.A. Gromoglasov, A.P. Pil'shchikov & V.F. Rodimenkova, Tr. Mosk. Energ. Inst. (1972), No. 128, 100–8.

Abstract: "Filtration on Granulated Active Carbon"—G. Bossy and Y. Sanchez, Tech. Eau Assainissement (1972), No. 307–308, 15–25.

Abstract: "Filter Cartridge for Water Purification"—Hiroshi Tasaka & Masanao Kowau, Jpn. Kokai Tokkyo Koho, pp.

Abstract: "Gravity Activated Carbon Filtration for Water Reuse"—Jih–Fen Kuo, James F. Stahl, Ching–lin Chen & Paul V. Bohlier, Proc.—Water Reuse Sump. (1994) 671–686.

Abstract: "Activated Carbon Filtration in Drinking Water Production: New Developments and Concepts"—S.G.J. Heijman & R. Hopman, Stud. Surf. Sci. Catal. (1999), 120B(Adsorption and Its Applications in Industry and Environmental Protection, vol. 2), 723–743.

* cited by examiner

Cone Penetrometer (Precision Scientific Co.)
ASTM Method D217-97

| Test # | Modified 80x325 Mesh | Preferred Embodiment |
|---|---|---|
| 1 | 0.7 mm | 0.5 mm |
| 2 | 1.0 mm | 0.5 mm |
| 3 | 0.8 mm | 0.5 mm |
| 4 | 1.6 mm | 0.5 mm |
| 5 | 2.0 mm | 0.7 mm |
| 6 | 1.1 mm | 0.7 mm |
| Average | 1.2 mm | 0.6 mm |

Fig.6

CARBON BLOCK WATER FILTER

BACKGROUND OF THE INVENTION

The present invention relates to filters, and more particularly to a carbon block water filter for a water treatment system.

The use of home water treatment systems to treat tap water continues to grow dramatically in the U.S. and abroad, in part because of heightened public awareness of the health concerns associated with the consumption of untreated tap water. The most cost-effective conventional home water treatment systems typically use a carbon block filter to remove particulate matter and adsorb organic contaminants from a water stream. A conventional carbon block filter includes a mass of densely packed activated carbon particles that are bonded together to form a block through which untreated water can be filtered. As untreated water passes through this dense brick a combination of mechanical filtration and adsorption operate to remove a high percentage of particulate matter and organic contaminants from the water stream.

Carbon block filter manufacture can be complicated and typically involves a careful balance of various competing interests. It has been known that smaller carbon particles provide improved filtration. This is due in large part to the fact that smaller particles provide increased surface area and create a more dense block that traps smaller particulate matter. Unfortunately, smaller carbon particle sizes create several problems. First, water flow rates through the filter are dramatically affected. The dense block not only traps smaller particulate matter but can also greatly restricts the flow of water, significantly reducing the amount of water that can be treated in a given amount of time. Second, a high percentage of smaller carbon particles makes it difficult to manufacture the carbon block using conventional manufacturing techniques. More specifically, higher levels of fine particles interfere with the binder's ability to make a solid carbon block. This causes cracking, crumbling and other defects in the carbon block, which in turn lead to low production yields. In balancing these concerns, conventional carbon block filter manufacturers typically use relatively large carbon particles in the manufacture of their carbon blocks. An alternative is to increase the level of binder contained in the block. Both of these practices generally increase production yields, while decreasing filter effectiveness. Typically, carbon block filters are manufactured from a standard 80×325 mesh carbon. Although the precise particle size distribution of standard 80×325 mesh carbon varies from manufacturer to manufacturer and from lot to lot, it typically includes a high percentage of +140 mesh carbon particles (i.e. particles that are larger in size than 140 mesh) and a small percentage of −325 mesh carbon particles (i.e. particles that are smaller in size than 325 mesh). A typical 80×325 mesh carbon usually has a mean particle diameter in the range of 98 microns or larger. As a result, filters manufactured from typical 80×325 mesh carbon generally provide relatively high productions yields and flow rate, but not exceptional filtration performance.

To increase filter performance at the expense of production yields and flow rates, another known carbon block manufacturer reduces the mean particle diameter of the carbon particles used to produce the block. To manufacture this carbon mixture, the carbon normally ground to form typical 80×325 mesh is subjected to a special grinding process that increases the level of carbon particles smaller than 325 mesh. Although the grinding operation inherently results in some variation, this modified carbon mixture generally provides a mean particle size of approximately 75 microns and a particle size distribution with approximately 25% or more of the carbon particles being larger than 140 mesh and 25% or more of the carbon particles being smaller than 500 mesh. Although the resulting carbon block filters provide improved performance, the high level of small carbon particles provides reduced flow rates and results in production losses of up to 20–30%. Further, the high level of small carbon particles produces carbon blocks that are relatively soft, making then susceptible to damage.

SUMMARY OF THE INVENTION

The aforementioned problems are overcome by the present invention wherein a carbon block filter is manufactured from a unique carbon mixture that provides a carbon block filter with improved performance, flow rates, hardness and production yields. The carbon mixture preferably including a mean particle diameter of about 60 to 80 microns and a particle size distribution of less than about 10% +140 mesh and less than about 10% −500 mesh. The carbon mixture is bonded together with a conventional binder to form an integrated carbon block. The carbon block can be incorporated into a wide range of carbon block filters in accordance with a variety of conventional techniques.

In a more preferred embodiment, the carbon block filter is manufactured from a carbon mixture having a mean particle size of about 65 to 75 microns and a particle size distribution of less than about 10% +140 mesh and less than about 10% −500 mesh.

In a most preferred embodiment, the carbon block filter is manufactured from a carbon mixture having a mean particle size of about 70 microns and a particle size distribution of less than approximately 7% +140 mesh and less than approximately 7.5% −500 mesh.

The present invention provides a carbon block filter that provides a reduced mean particle diameter and hence enhanced filtering performance over time. The carbon mixture also provides improved production yields. Further, the present invention provides a harder carbon block that is less susceptible to damage. Additionally, the present invention provides significantly improved flow rates over conventional carbon block filters with similar mean particle size.

These and other objects, advantages, and features of the invention will be readily understood and appreciated by reference to the detailed description of the preferred embodiment and the drawings.

BRIEF DESCRIPTION OF THE DRAWINGS

FIG. 6 is a table showing the results of hardness test performed on a filter manufactured from modified 80×325 mesh carbon and a filter manufactured from a carbon mixture in accordance with a preferred embodiment of the present invention.

DETAILED DESCRIPTION OF THE PREFERRED EMBODIMENT

Figure 1:
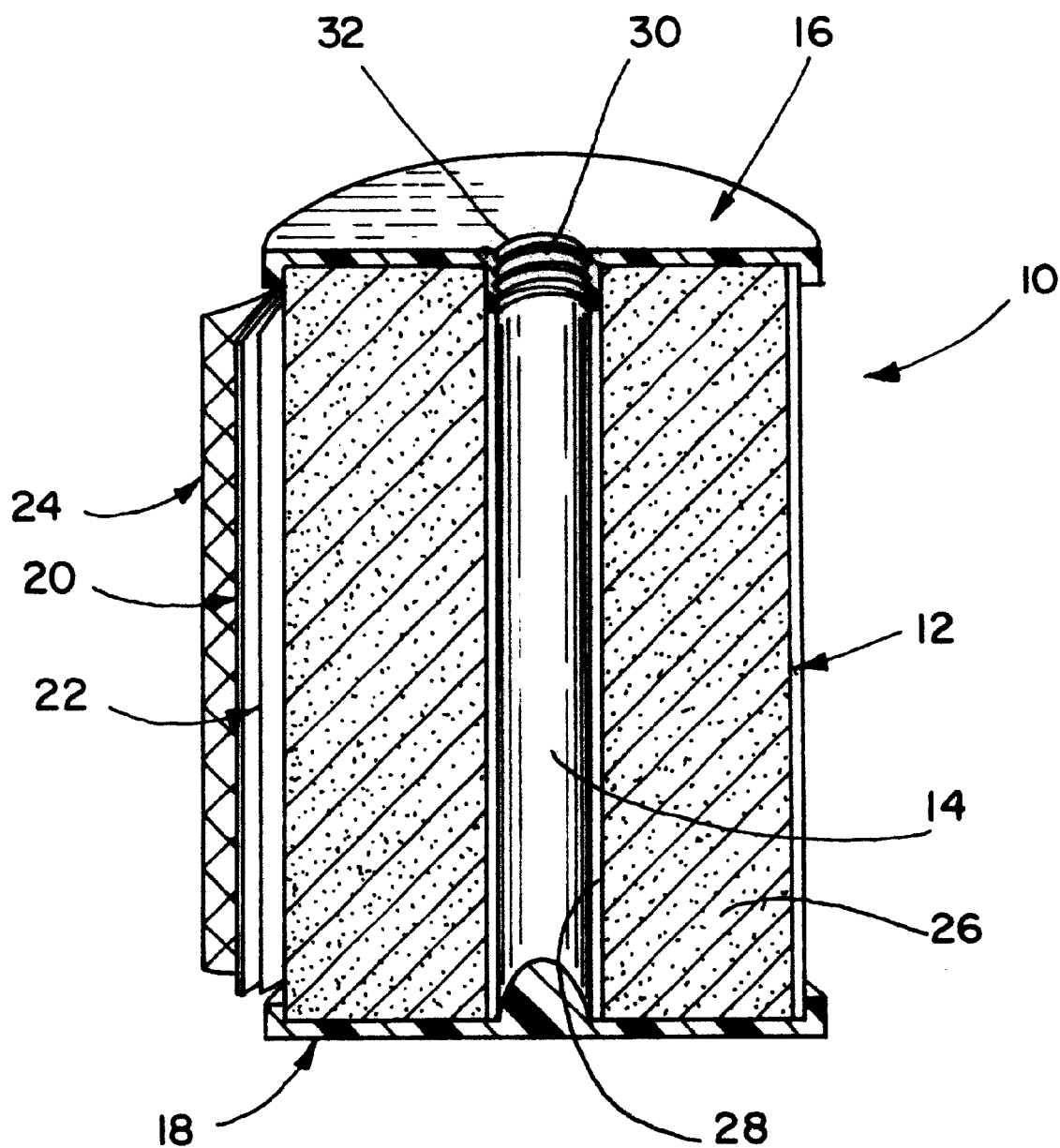
FIG. 1 is a cross sectional perspective view of a carbon block filter manufactured in accordance with a preferred embodiment of the present invention.

A carbon block filter according to a preferred embodiment of the present invention is shown in FIG. 1 and generally designated 10. The carbon block filter 10 generally includes a carbon sleeve (or carbon block) 12, a nonwoven plastic core 14 disposed concentrically within the carbon sleeve 12, a top end cap 16 and a bottom end cap 18. A fabric 22 and fabric scrim 20 are wrapped about the carbon sleeve 12, and are held in place by a plastic net wrap 24. The carbon sleeve 12 is a hollow core cylindrical block of bonded, activated carbon. The particles of the activated carbon mixture are provided with a unique mean particle size and particle size distribution to yield a carbon block filter with a variety of advantages, which are described in some detail below. Although described in connection with a hollow core cylindrical block, the present invention is well suited for use in carbon block filters of various other configurations. As used herein, the terms "inner," "inwardly," "outer," and "outwardly" are used to refer to directions relative to the geometric axial center of the carbon block filter.

The nonwoven plastic core 14 is a conventional nonwoven plastic material, such as spun-bonded polypropylene, that defines a porous circumferential wall that permits water to flow readily through the sleeve core, particularly in a radial direction. The plastic core 14 is preferably manufactured from a rolled sheet of the desired nonwoven material. In operation, the nonwoven material prevents the flow of large carbon particles that may separate from the filter into the output stream, but is porous enough to permit adequate water flow. The outer diameter of the plastic core 14 will vary from application to application, but will preferably be selected to fit snugly within the inner diameter of the carbon sleeve 12. Preferably, the plastic core 14 will have an outer diameter of approximately one inch.

The top end cap 16 is disposed on the top axial end of the carbon sleeve 12 to prevent the flow of water through the top axial end of the carbon sleeve 12. The top end cap 16 is preferably manufactured from a nonporous polymeric material, such as polypropylene. The top end cap 16 preferably defines a central opening 30 that is coaxial with the plastic core 14 and a neck 32 surrounding the opening 30. The neck 32 is threaded to permit the carbon block filter 10 to be threadedly mounted to a suitable threaded filter housing (not shown). The inner diameter of the opening 30 preferably corresponds approximately with the inner diameter of the core 14.

The bottom end cap 18 is disposed on the bottom axial end of the carbon sleeve 12 to prevent the flow of water through the bottom axial end of the carbon sleeve 12. The bottom end cap 18 is substantially identical to the top end cap 16, except that it is fully closed and does not include any neck or openings.

The inner carbon sleeve 12 is a contiguous block of activated carbon particles bonded together by a conventional carbon block binder. The carbon sleeve 12 preferably includes a circumferential wall 26 defining a central opening 28. The dimensions of the wall 26 and the central opening 28 will vary from application to application. The makeup of the carbon mixture will be described in more detail below. The binder is preferably a polymeric material with a very low melt index (melt flow rate) and is preferably an ultra high molecular weight, high density polyethylene, such as Hostalen® GUR-212. A preferred binder is described and disclosed in connection with the carbon block filter of U.S. Pat. No. 4,753,728 to VanderBilt et al, the subject matter of which is incorporated herein by reference.

The carbon block filter 10 of the present invention is manufactured using conventional manufacturing techniques and apparatus. In general, the binder (in powder form) and carbon are uniformly mixed so that the binder is uniformly dispersed throughout the carbon. The binder is preferably from about 17 to about 25 percent, and most preferably about 20 percent, by weight based on the combined weight of the carbon and the binder. The combined carbon and binder are fed into a conventional cylindrical mold (not shown) having an upwardly projecting central dowel. The mold and its contents are then heated to from about 175 to about 205 degrees centigrade. Simultaneously, the combined carbon and binder are subjected to from about 30 to about 120 psi pressure via a conventional pressure piston (not shown), which is lowered into the mold and which includes a central clearance opening for the central dowel. The combined carbon and binder are then permitted to cool and the resulting structure is removed from the mold in the form of an integrated carbon sleeve 12.

The carbon sleeve 12 is then trimmed, if necessary. The fabric 22 and scrim 20 are added to the carbon block, primarily to function as a prefilter. In general, a layer of nonwoven scrim 20 and a somewhat thicker nonwoven fabric 22 are cut and wrapped around the carbon block. The fabric 22 preferably has an effective porosity of about 10 microns and a thickness of approximately ⅛ of an inch. The fabric 22 and scrim 20 are held in place by a plastic net 24 that is wrapped around the outside of the fabric 22 and scrim 20 in a conventional manner.

The nonwoven plastic core 14 is typically cut from a sheet of the desired nonwoven material. The cut sheet of material is rolled into the form of a tube and inserted into the center of the carbon sleeve 12. The core 14 can be adhesively or otherwise secured within the center of the carbon sleeve 12, but is typically held in place by frictional forces caused by its tendency to unroll and by its interaction with the end caps 16 and 18.

The bottom end cap 18 is manufactured in a conventional manner using a conventional aluminum mold (not shown). In general, a powdered plastic, such as a powdered polypropylene, is poured into the aluminum mold and heated to a liquid state. The carbon sleeve 12 is then pushed into the mold with its bottom axial end in contact with the plastic, where it remains while the plastic is permitted to cool and harden to define the bottom end cap 18. The top end cap 16 is manufactured in a similar manner, except that the top end cap mold (not shown) is shaped to define the internally threaded neck 32. Again, the powdered plastic is supplied to the mold and heated to a liquid state. The carbon sleeve 12 is then pushed into the top end cap mold with its top axial end in contact with the plastic. The carbon block remains in place until the plastic has sufficiently cooled. The carbon sleeve 12 and end cap assembly is then threaded off of the threaded member and removed from the mold. Alternatively, the top and bottom end caps can be separately manufactured, for example, by conventional injection molding, and then attached to the carbon sleeve 12 by cement, adhesive or otherwise. If desired, a threaded insert can be used in the molding process of the top end cap to provide a threaded member for attaching the carbon block filter 10 to a suitable filter housing.

For purposes of this disclosure, the carbon particle size and size distribution will generally be described in terms of mesh sizes as measured using a generally conventional wet sieve analysis. A wet sieve analysis is a conventional process in which a carbon mixture is separated into ranges or "bins" based on particle size. In general, the carbon mixture is passed, with the aid of water, sequentially through a series of screens, each with progressively smaller openings, down to a 500 mesh screen. Particles larger than the opening size of a specific screen will remain atop that screen while smaller particles will pass through the screen to the next smaller screen. Particles smaller than the openings of 500 mesh screen are typically referred to as "fines." The level of fines can vary significantly from carbon mixture to carbon mixture, and in some carbon mixtures may comprise as much as 20% by weight. Fines are typically disregarded by the carbon producers themselves in grading their carbons. In this disclosure, including the claims, fines are considered for purposes of particle size distribution, but are disregarded for purposes of mean particle diameter. As an expedient, conventional mesh size notation will be used to refer to size ranges. More specifically, the notation "+" in front of a mesh size refers to particles too large to pass through a screen of the noted size. For example, +140 mesh refers to particles that are too large to pass through a screen of 140 mesh size. Similarly, the notation "−" in front of a mesh size refers to particles small enough to pass through a screen of the noted size. For example, −500 mesh refers to particles that are small enough to pass through a screen of 500 mesh size. Using this notation, the term "fines" refers to −500 mesh carbon particles. In referring to particle distributions, the notation "×" between two mesh sizes refers to a range of sizes. For example, 140×200 refers to a range or bin of carbon particle sizes smaller than 140 mesh and greater than 200 mesh.

Figure 2:
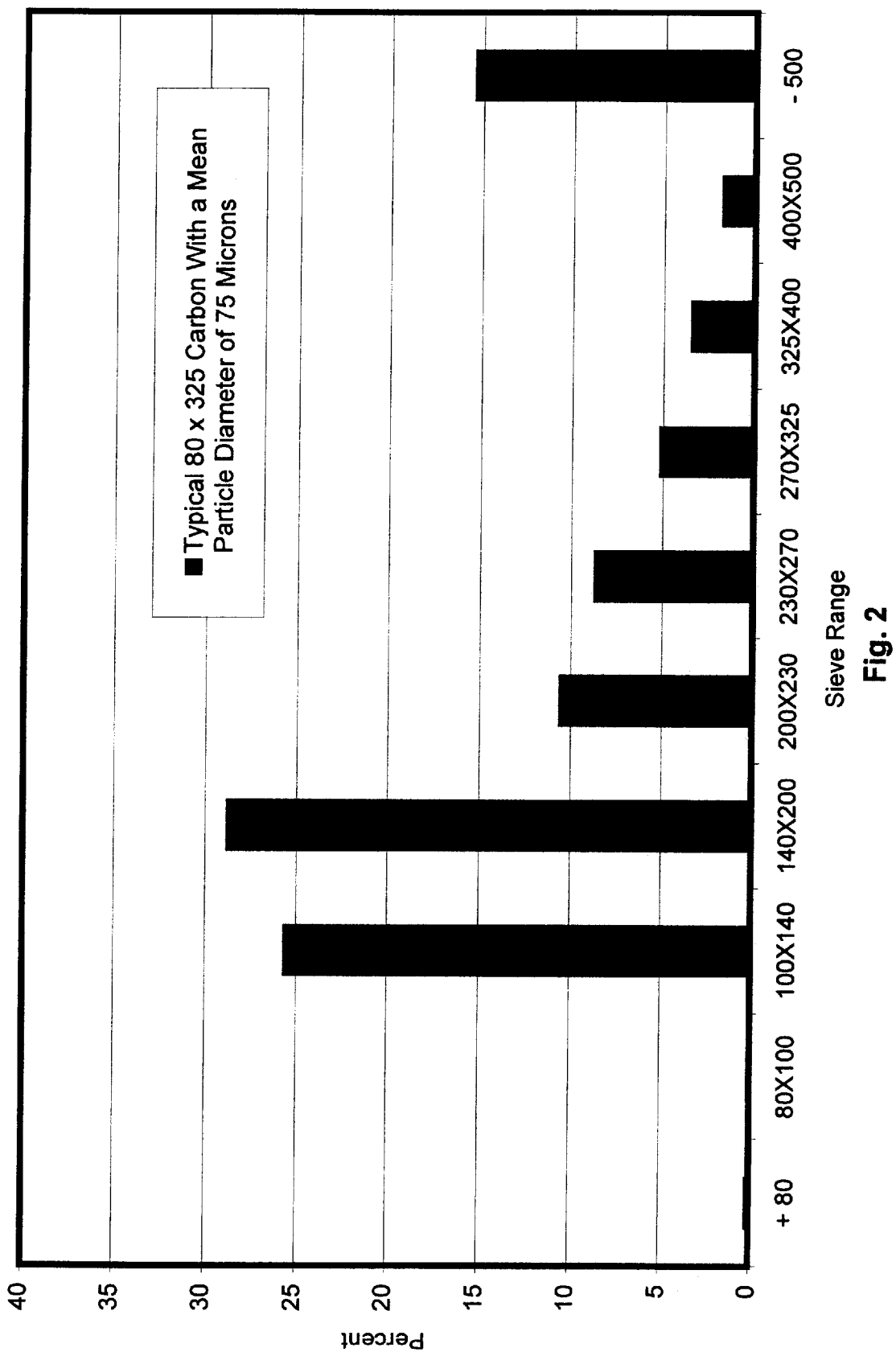
FIG. 2 is a bar chart showing the particle size distribution of a prior art typical 80×325 mesh carbon.
Figure 3:
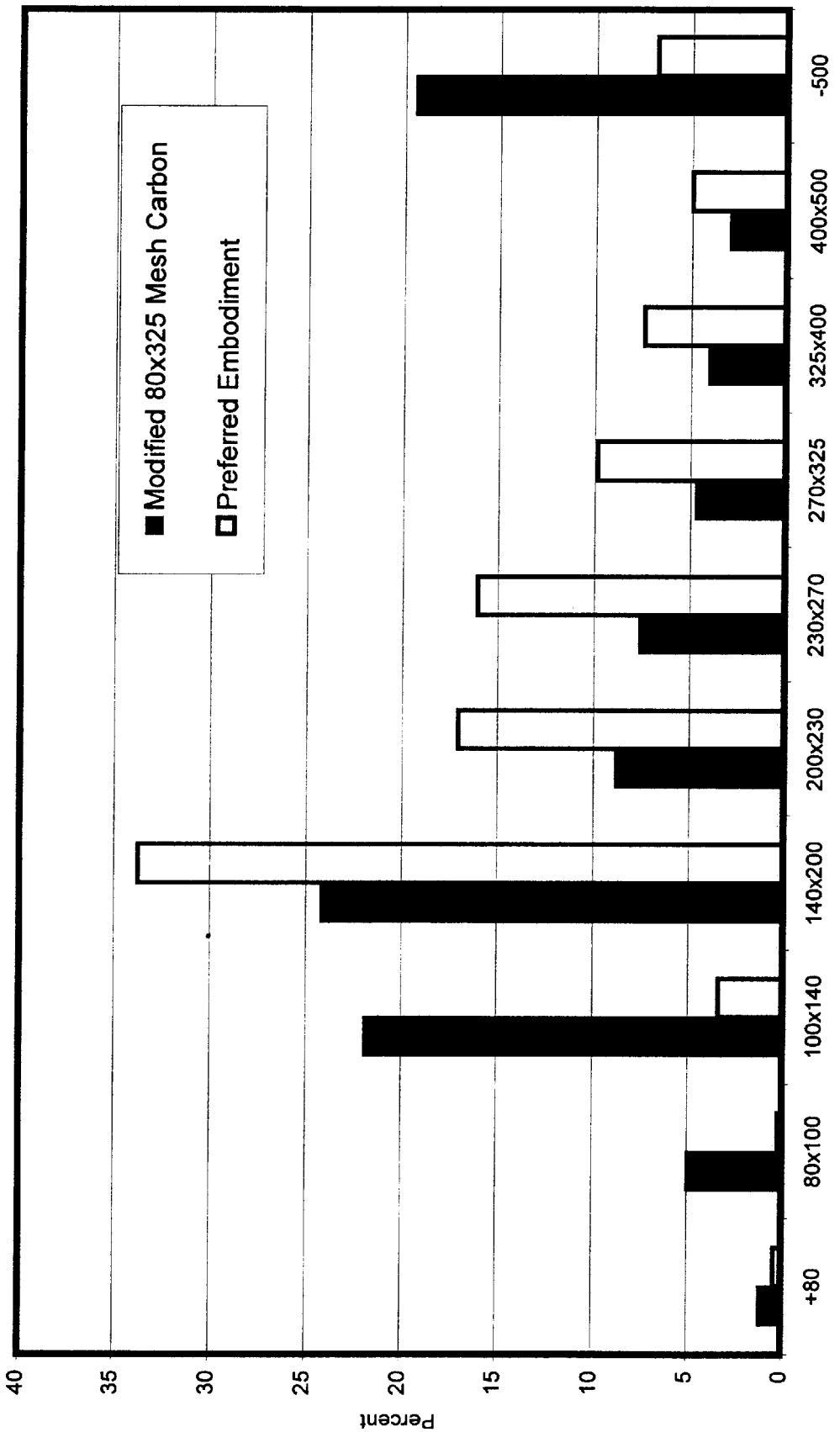
FIG. 3 is a bar chart showing the particle size distribution of a prior art modified 80×325 mesh carbon and of a carbon mixture in accordance with a preferred embodiment of the present invention.

The unique nature of the carbon mixture of the present invention is described in connection with FIGS. 2–3. FIG. 2 shows the particle size distribution, by weight, of a typical prior art 80–325 mesh carbon. The illustrated distribution is representative of a typical 80×325 mesh carbon that might be obtained using a conventional wet sieve analysis, but it should be recognized that typical 80×325 mesh carbon will vary in particle size distribution and in mean particle diameter from manufacturer to manufacturer and from production lot to production lot. Typical 80×325 mesh carbon is available "off the shelf" from a number of known carbon manufacturers, and is used by a variety of carbon block filter manufacturers without modification. The bar chart of FIG. 2 is divided into "bins" or ranges, each bin showing the percentage, by weight, of carbon particles that fall within that particular size bin. For example, the bar over 100×140 shows the percentage, by weight, of particles that are smaller than 100 mesh and greater than 140 mesh. As illustrated, the percentage of +140 mesh particles is greater than 40%. In this representative distribution, the mean particle diameter is approximately 98 microns. The carbon block filters manufactured from this carbon suffer from a variety of disadvantages, including lower filtration performance. FIG. 3 shows the particle size distribution, by weight, of a prior art modified 80×325 mesh carbon measured using a conventional wet sieve analysis. This carbon is referred to as "modified" because it is produced by a modified grinding process designed to provide a reduced mean particle diameter. More specifically, the modified 80×325 mesh carbon is ground to provide an increased level of fines, which in turn reduces the mean particle diameter and provides better filtration performance. As illustrated, the percentage of +140 mesh particles is greater than 25% and the percentage of −500 mesh particles is nearly 20%. Carbon block filters manufactured from this modified 80×325 mesh carbon provide improved filtration performance s compared to filters manufactured from typical 80×325 mesh carbon, but they suffer from other disadvantages. For example, filters manufactured from the modified 80×325 mesh are relatively soft, suffer from reduced flow rates and have production yield losses of up to 20%.

FIG. 3 also shows the particle size distribution, by weight, of a carbon mixture in accordance with a preferred embodiment of the present invention as measured using a conventional wet sieve analysis. As illustrated, the percentage of +140 mesh particles is less than 5% and the percentage of −500 mesh particles is approximately 7.5%. Carbon block filters manufactured with the unique carbon of the present invention have dramatically improved production yields (up to 98%) when compared to the modified 80×325 mesh carbon. Additional advantages of the present invention over the typical and modified 80×325 mesh carbons of the prior art are described below.

Figure 4:
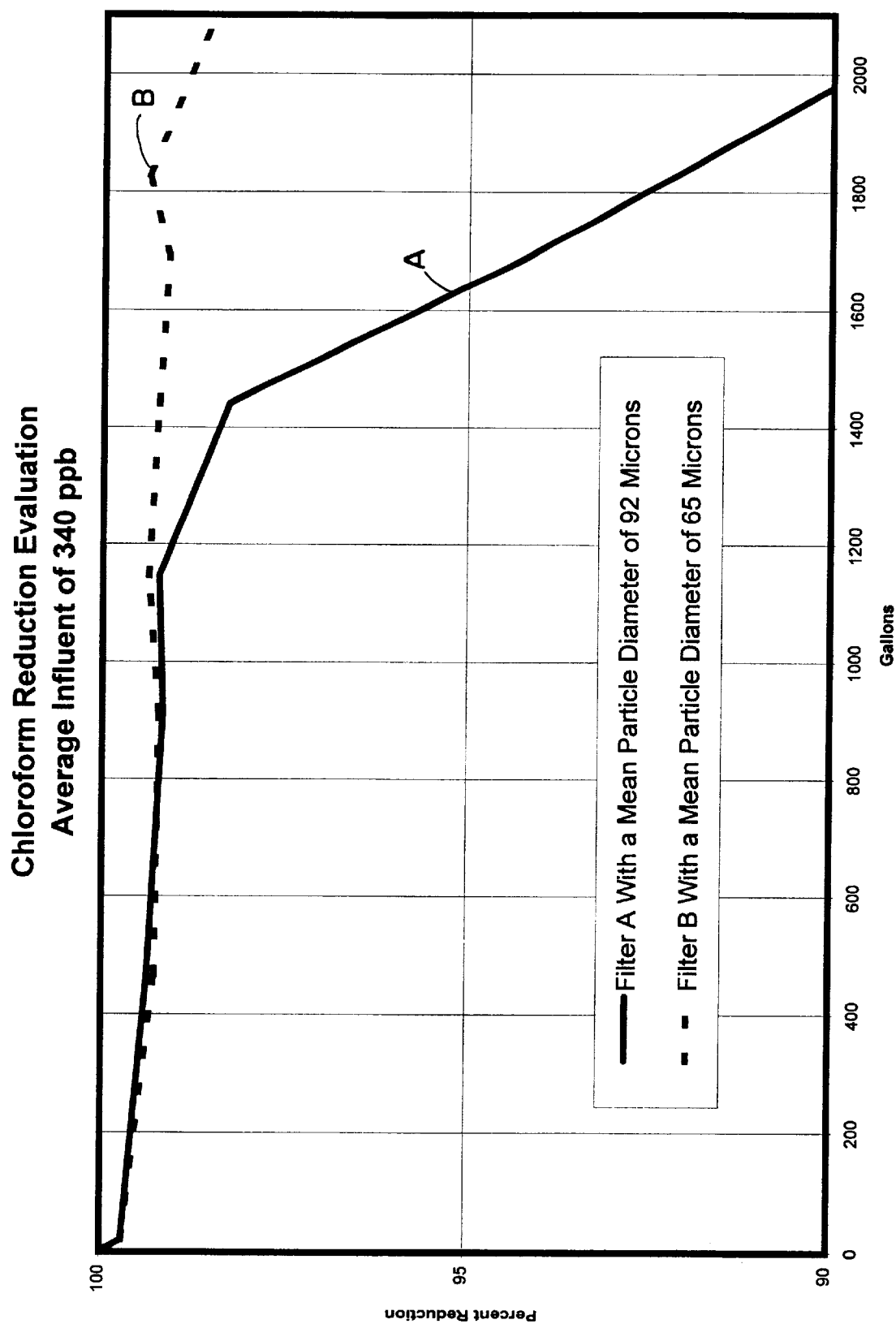
FIG. 4 is a line graph showing the filtration performance over time of two filters of differing mean particle diameter.

The present invention provides improved filtration performance over carbon block filters manufactured from carbon mixtures with a larger mean particle size, such as the typical 80×325 mesh carbon represented in FIG. 1. First, filters with smaller mean particle diameters provide improved mechanical filtering. This is because the spaces between the carbon particles through which the water must flow are, on average, smaller. Because the spaces are smaller, they mechanically trap smaller particles and provide improved mechanical filtration. Second, filters with smaller mean particle diameters also provide improved filtration over time. FIG. 4 is a graphic illustration of the improved filtration performance provided by carbon block filters of lower mean particle diameter. FIG. 4 compares the reduction in chloroform over time provided by filters of different mean particle diameters when tested in accordance with ANSI/NSF 53 -1999*a*, entitled "Drinking Water Treatment Units-Health Effects, VOCs Reduction," which is incorporated herein by reference. This test is designed to provide a measure of the life of a filter by measuring the amount of water that a given filter can treat before it fails to provide a specified level of filtration. As defined in ANSI/NSF 53 -1999*a*, a filter fails when it is no longer capable of providing at least a 95% reduction in chloroform levels. Line A is a plot of the percent reduction in chloroform provided by a carbon block filter having a mean particle diameter of 92 microns for influent having average chloroform levels of 340 parts per billion ("ppb"). As shown, the performance of this filter begins to tail off dramatically once approximately 1200 gallons of water have been treated. In fact, the filter fails the 95% reduction standard set by ANSI/NSF 53 -1999*a* after approximately 1650 gallons have been treated. Line B is a plot of the percent reduction in chloroform provided by a carbon block filter having a mean particle diameter of 65 microns, again for influent having average chloroform levels of 340 ppb. As shown, the performance of this filter remains well over 95% even after 2000 gallons of water have been treated, thereby evidencing improved filtration performance over time.

Figure 5:
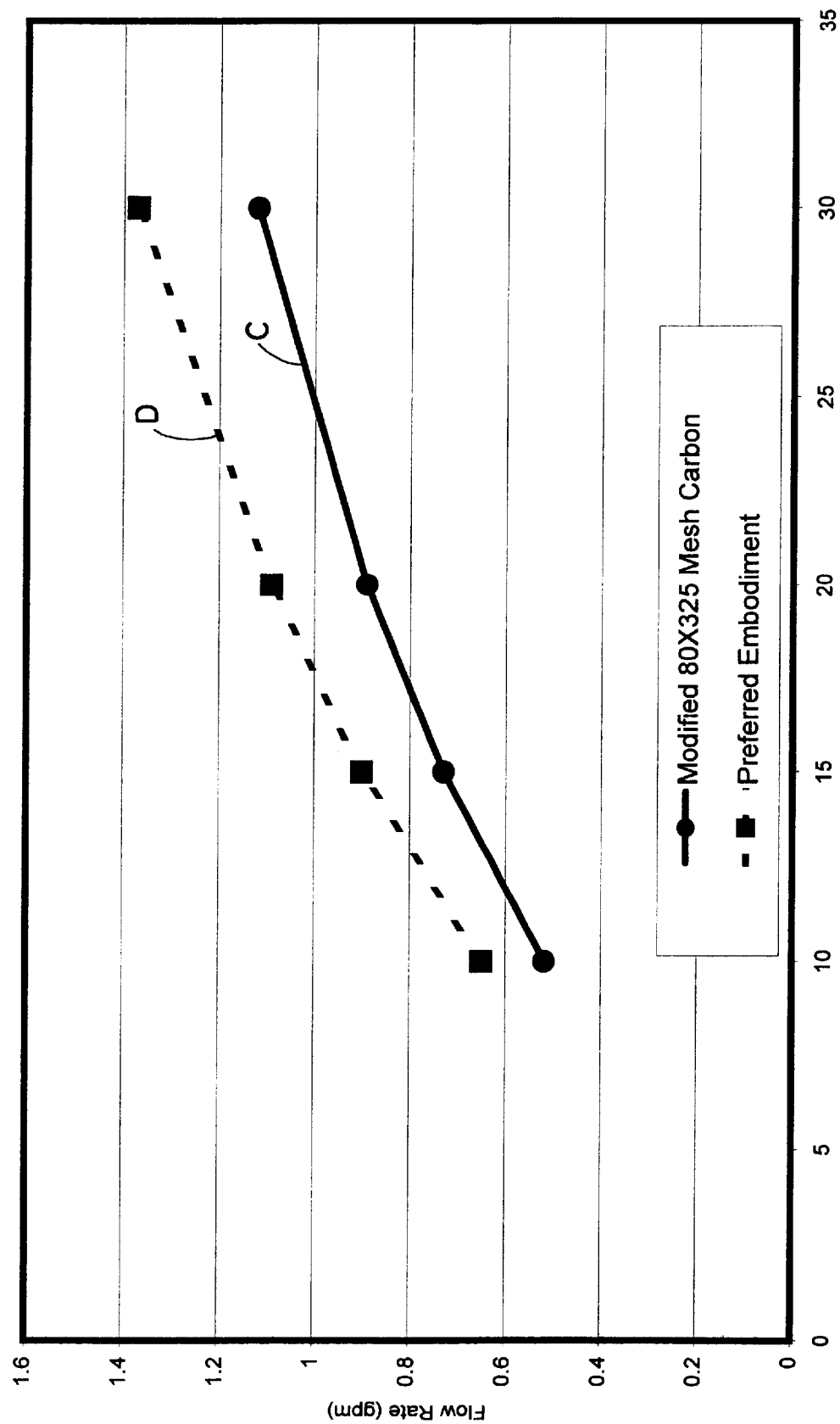
FIG. 5 is a line graph showing the flow rates of a filter manufactured from modified 80×325 mesh carbon and a filter manufactured from a carbon mixture in accordance with a preferred embodiment of the present invention.

The present invention also provides improved flow rates over conventional carbon block filters manufactured from the modified 80×325 mesh carbon of the prior art. FIG. 5 illustrates the flow rate of water through the tested carbon block filters under pressures ranging from 10 to 30 pounds per square inch gauge ("psig"). This range of pressure is roughly equivalent to the range of differential pressure across the filter block that would be present in typical home use. Line C represents the flow rate of water through the filter manufactured from the modified 80×325 mesh carbon between pressures of 10 psig and 30 psig. Line D represents the flow rate of water through the filter manufactured from a carbon mixture in accordance a preferred embodiment of the present invention between pressures of 10 psig and 30 psig. As shown, the filter manufactured from a preferred carbon provides significantly improved flow rates, meaning that it is capable of treating more water over a given period of time.

Another benefit of the present invention over the modified 80×325 mesh carbon of the prior art is that it yields harder (stronger) carbon block filters. FIG. 6 presents the results of six hardness tests performed on a filter manufactured from the preferred carbon and a filter manufactured from the modified 80×325 mesh carbon of the prior art. The test was performed in accordance with ASTM D217 -97, which is incorporated herein by reference. In general, the test consists of measuring the amount of penetration into the filter achieved by a weighted cone under certain specified conditions. The tests were performed using a cone penetrometer manufactured by Precision Scientific Company. As shown, the filter manufactured from the preferred carbon proved to be substantially harder than the filter manufactured from the modified 80×325 mesh carbon. In fact, the average level of penetration over the six tests for the preferred carbon was only half that of the modified 80×325 mesh carbon. These tests demonstrate that carbon block filters manufactured from the preferred carbon are likely to be less susceptible to damage, for example, during manufacture, shipping, and installation.

Although the present invention is described in connection with a specific particle size distribution and mean particle diameter, the present invention is intended to encompass a range of carbon mixtures in which the mean particle diameter and particle size distribution vary somewhat from the described embodiment. More specifically, the present invention is directed to carbon mixtures in which the mean particle diameter ranges between approximately 60 microns and 80 microns, and in which the +140 mesh particles and the −500 mesh particles are each less than approximately 10% of the particle size distribution. The mean particle diameter is, however, more preferably about 65 to about 75 microns, and most preferably about 70 microns. The +140 mesh particles and the −500 mesh particles are more preferably each less than approximately 8% of the particle size distribution, and most preferably each less than approximately 7% and 7.5%, respectively, of the particle size distribution. The most preferred mean particle diameter and particle size distribution should provide an optimal balance of filtration performance, flow rate, production yield and hardness. FIG. 6 shows the particle size distribution of various carbon mixtures in accordance with various embodiments of the present invention. FIG. 6 is not intended to limit the scope of the present invention, but rather is intended to provide a representative sample of various carbon mixtures that satisfy the mean particle diameter and particle size distribution objectives of the present invention.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A carbon block for a carbon block filter comprising activated carbon particles and a binder, wherein said carbon particles have a mean particle diameter ranging from about 60 microns to about 80 microns and wherein said carbon particles have a particle size distribution in which no more than about 10% by weight of said carbon particles are larger than about 140 mesh and no more than about 10% by weight of said carbon particles are smaller than about 500 mesh.

2. The carbon block of claim 1 wherein said mean particle diameter is further defined as ranging between about 65 microns and about 75 microns.

3. The carbon block of claim 1 wherein said particle size distribution is further defined as having no more than about 8% by weight of said carbon particles larger than about 140 mesh.

4. The carbon block of claim 1 wherein said particle size distribution is farther defined as having no more than about 8% by weight of said carbon particles smaller than about 500 mesh.

5. The carbon block of claim 1 wherein said particle size distribution is further defined as having no more than about 7% by weight of said carbon particles larger than about 140 mesh.

6. The carbon block of claim 1 wherein said particle size distribution is further defined as having no more than about 7.5% by weight of said carbon particles smaller than about 500 mesh.

7. The carbon block of claim 1 wherein said mean particle diameter is further defined as about 70 microns.

8. The carbon block of claim 7 wherein said particle size distribution is further defined as having no more than about 7% by weight of said carbon particles larger than about 140 mesh and no more than about 7.5% by weight of said carbon particles smaller than about 500 mesh.

9. A carbon block filter comprising:
   a carbon block formed by bonding together an activated carbon mixture with a binder, said carbon mixture having a mean particle diameter in a range of about 60 microns to about 80 micron and a particle size distribution having less than 10% by weight each of particles larger than 140 mesh and particles smaller than 500 mesh;
   first and second end caps mounted to opposite ends of said carbon block; and
   a nonwoven fabric disposed about said carbon block.

10. The filter of claim 9 wherein said mean particle diameter is further defined as ranging between about 65 microns and about 75 microns.

11. The filter of claim 9 wherein said particle size distribution is further defined as having no more than about 8% by weight of said carbon particles larger than about 140 mesh.

12. The filter of claim 11 wherein said particle size distribution is filter defined as having no more than about 8% by weight of said carbon particles smaller than about 500 mesh.

13. The filter of claim 9 wherein said particle size distribution is further defined as having no more than about 7% by weight of said carbon particles larger than about 140 mesh.

14. The filter of claim 13 wherein said particle size distribution is further defined as having no more than about 7.5% by weight of said carbon particles smaller than about 500 mesh.

15. The filter of claim 14 wherein said mean particle diameter is further defined as about 70 microns.

16. A carbon block for a carbon block filter comprising a binder and a mixture of carbon particles bonded together by said binder, said carbon particles having a particle size distribution with less than 10% by weight larger than 140 mesh and with less than 10% by weight smaller than 500 mesh.

17. The filter of claim 16 wherein said carbon particles have a mean particle diameter in a range of between about 60 microns and about 80 microns.

18. The filter of claim 17 wherein said particle size distribution is further defined as including less than 7% by weight larger than 140 mesh and less than 7.5% by weight smaller than 500 mesh.

19. The filter of claim 18 wherein said carbon particles have a mean particle diameter of about 70 microns.

20. A method for manufacturing a carbon block for a carbon block filter, comprising the steps of:

providing a carbon mixture having a mean particle diameter in a range of about 60 microns to about 80 microns and a particle size distribution having less than 10% by weight each of particles larger than 140 mesh and particles smaller than 500 mesh;

combining the carbon mixture with a binder;

dispersing the binder substantially uniformly throughout the carbon mixture;

applying heat and pressure to the combined carbon mixture and binder; and permitting the combined carbon mixture and binder to cure, whereby an integrated structure is formed.

21. The method of claim 20 wherein the carbon mixture is further defined as having a mean particle diameter in a range of about 65 microns to about 75 microns.

22. The method of claim 20 wherein the carbon mixture is further defined as having a mean particle diameter of about 70 microns.

23. The method of claim 22 wherein the carbon mixture is further defined as having a particle size distribution having less than 7% by weight of particles larger than 140 mesh and less than 7.5% by weight of particles smaller than 500 mesh.

* * * * *

UNITED STATES PATENT AND TRADEMARK OFFICE
CERTIFICATE OF CORRECTION

PATENT NO. : 6,368,504 B1
DATED : April 9, 2002
INVENTOR(S) : Kuennen et al.

It is certified that error appears in the above-identified patent and that said Letters Patent is hereby corrected as shown below:

Column 8,
Line 21, "farther" should be -- further --
Line 57, "filter" should be -- further --

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,368,504 B1
DATED : April 9, 2002
INVENTOR(S) : Kuennen et al.

It is certified that error appears in the above-identified patent and that said Letters Patent is hereby corrected as shown below:

Drawings,
FIG. 2 should be replaced with the attached FIG. 2

Figure 7:
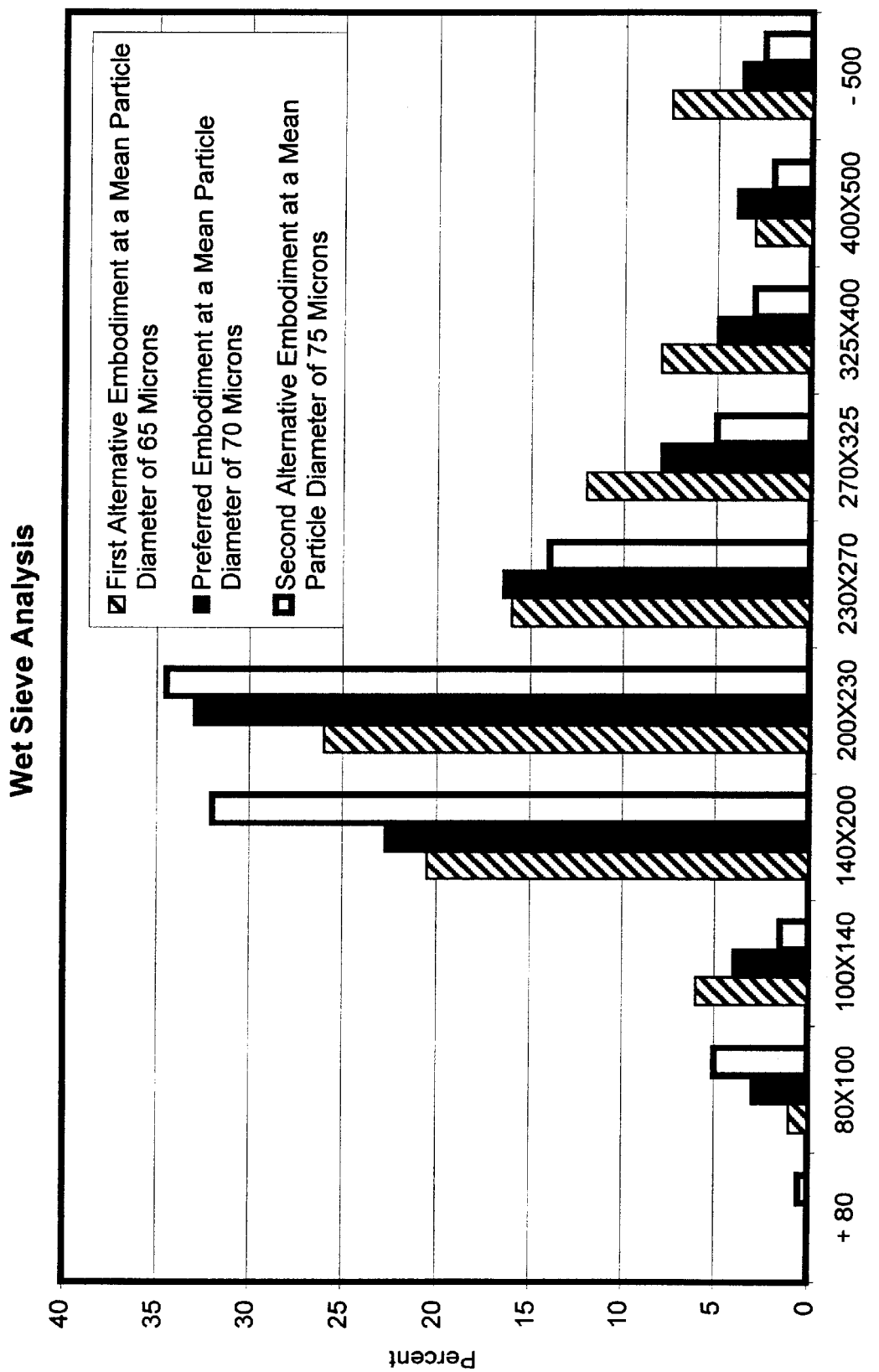
FIG. 7 is a bar chart showing the particle size distribution of various carbon mixtures in accordance with various embodiments of the present invention.
Figure 2:
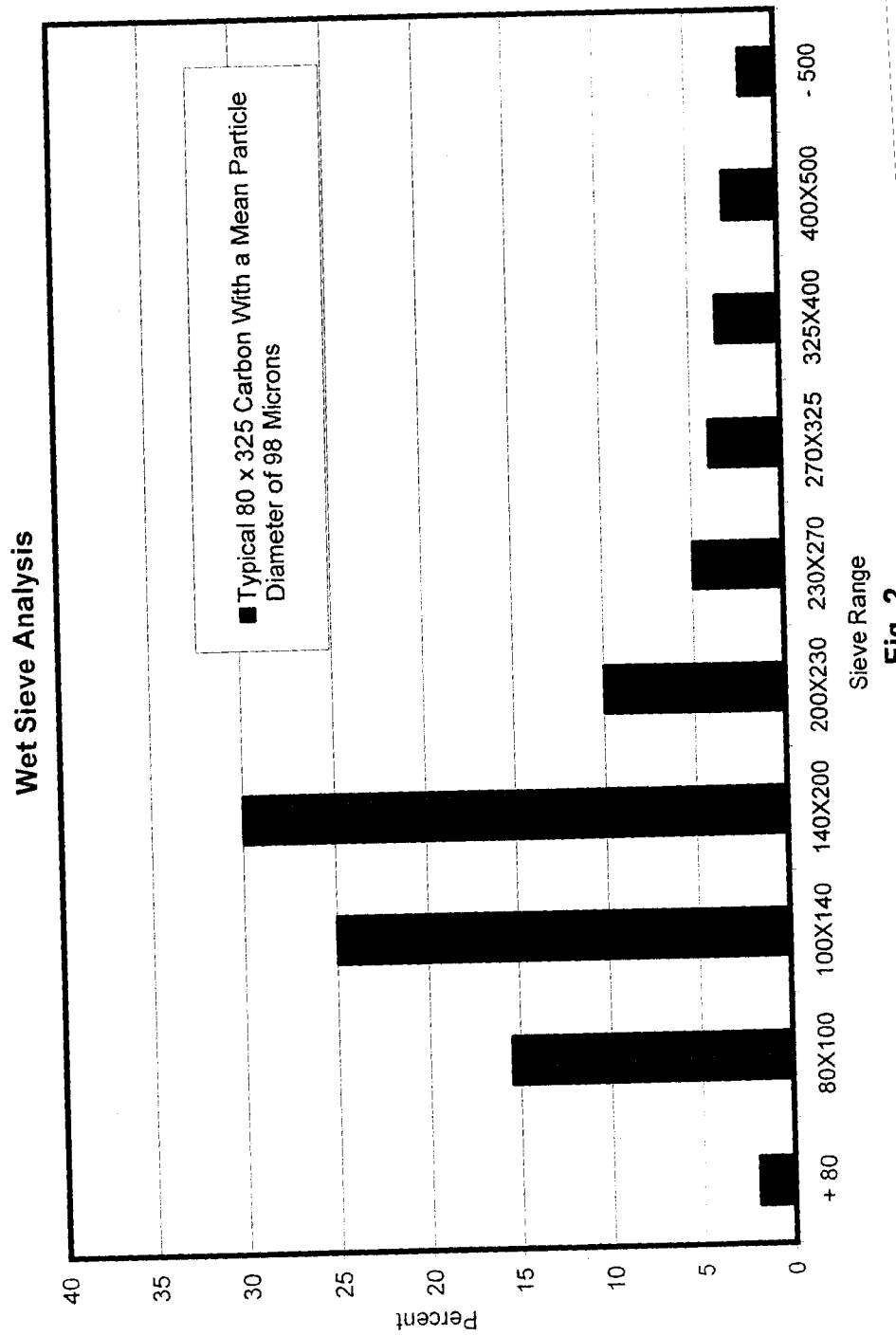

Column 7,
Lines 55 and 57, "FIG. 6" should be -- FIG. 7 --

Signed and Sealed this

Seventeenth Day of August, 2004

JON W. DUDAS
*Acting Director of the United States Patent and Trademark Office*